(12) United States Patent
Nash et al.

(10) Patent No.: US 11,138,459 B2
(45) Date of Patent: Oct. 5, 2021

(54) COGNITIVE CONTAINER CONTENT DETERMINATION

(71) Applicant: International Business Machines Corporation, Armonk, NY (US)

(72) Inventors: Julia Ruth Nash, Richardson, TX (US); Shaila Pervin, Wolli Creek (AU); Daniel Terlizzi, East Stroudsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/543,978

(22) Filed: Aug. 19, 2019

(65) Prior Publication Data

US 2021/0056342 A1 Feb. 25, 2021

(51) Int. Cl.

| G06K 9/62 | (2006.01) |
|---|---|
| G06K 7/14 | (2006.01) |
| G06K 9/00 | (2006.01) |
| G06F 16/583 | (2019.01) |
| G06T 7/20 | (2017.01) |
| G06T 1/20 | (2006.01) |

(52) U.S. Cl.
CPC ....... *G06K 9/6201* (2013.01); *G06F 16/5854* (2019.01); *G06K 7/1443* (2013.01); *G06K 9/00771* (2013.01); *G06T 7/20* (2013.01)

(58) Field of Classification Search
CPC ............. G06K 9/6201; G06K 9/00771; G06K 7/1443; G06F 16/5854; G06T 7/20
See application file for complete search history.

(56) References Cited

U.S. PATENT DOCUMENTS

| 9,505,554 | B1* | 11/2016 | Kong ................... G06K 9/3233 |
| 9,786,145 | B2 | 10/2017 | Oppenheimer |
| 10,148,918 | B1* | 12/2018 | Seiger .................. G06Q 10/087 |
| 10,618,172 | B1* | 4/2020 | Diankov ................ B25J 9/1697 |
| 10,733,328 | B1* | 8/2020 | Perkins ................. G06F 3/0622 |
| 10,853,757 | B1* | 12/2020 | Hill ..................... G06K 9/00671 |
| 2007/0182818 | A1* | 8/2007 | Buehler ........... G08B 13/19641 348/143 |

(Continued)

FOREIGN PATENT DOCUMENTS

CN 103729745 A 4/2014

Primary Examiner — Kim Y Vu
Assistant Examiner — Molly Delaney
(74) Attorney, Agent, or Firm — David K. Mattheis; Maeve M. Carpenter

(57) ABSTRACT

A listing of objects expected to be loaded into a container is received, and as an object is added to a container sensors monitoring an opening of the container detect the object. The added object is identified by object recognition techniques applied to received sensor data. Detection of a triggering event indicating completion of adding objects to the container is determined, and in response, the identity of the added object is compared to the received list of objects. In response to determining the object added to the container fails to match an object on the received list of objects, a notification of non-matching content is generated, and in response to determining the object added to the container matches an object on the received list of objects, a notification confirming the match of content in the container to the list of objects is generated.

20 Claims, 3 Drawing Sheets

(56) References Cited

U.S. PATENT DOCUMENTS

| | | | |
|---|---|---|---|
| 2012/0019399 A1* | 1/2012 | Vargo | G06K 7/0008 |
| | | | 340/870.11 |
| 2013/0132218 A1* | 5/2013 | Aihara | G06Q 20/3276 |
| | | | 705/21 |
| 2013/0339026 A1 | 12/2013 | Lee | |
| 2014/0057609 A1 | 2/2014 | Vaananen | |
| 2015/0161873 A1 | 6/2015 | Nye | |
| 2016/0350639 A1 | 12/2016 | Tere | |
| 2016/0375946 A1 | 12/2016 | White, Jr. | |
| 2017/0161703 A1* | 6/2017 | Dodia | G06K 19/06028 |
| 2018/0165556 A1 | 6/2018 | Warmath | |
| 2020/0065748 A1* | 2/2020 | Durkee | G06Q 30/0639 |

* cited by examiner

COGNITIVE CONTAINER CONTENT DETERMINATION

FIELD OF THE INVENTION

The present invention relates generally to the field of object recognition, and more particularly to tracking expected objects against objects loaded into a container.

BACKGROUND OF THE INVENTION

Various types of containers are used to hold, transport, store, or protect contents. Containers can include large shipping boxes used in trucking and shipping industries, to packages used for deliveries to homes and businesses, as well as personal items such as duffle bags, shopping bags, backpacks, and luggage. In some cases, the inclusion of particular contents of the container is important relative to the intended use of the container.

Object recognition technology is applied to enable computer vision for locating and identifying objects, typically in images or video sequences. Challenges include varying sizes, perspective of view, and partial obstruction. Techniques may include edge detection/matching, template-based recognition, feature matching, and are augmented by use of machine learning approaches, such as Scale-invariant feature transform (SIFT), and use of deep learning approaches, such as Single Shot Multi-Box Detector (SSD).

SUMMARY

Embodiments of the present invention disclose a method, computer program product, and system. The method provides for one or more processors to receive input including a list of objects. The one or more processors detect an object of the one or more objects added to a container by accessing a plurality of data from one or more sensors monitoring an opening of a container. The one or more processors identify the one or more objects added to the container by analyzing the plurality of data. The one or more processors detect whether a triggering event occurs indicating completion of adding the one or more objects to the container. In response to detecting the triggering event, the one or more processors compare an identity of the one or more objects added to the container to the list of objects. In response to determining the one or more objects added to the container fail to match the list of objects, the one or more processors generate a notification of non-matching content, and in response to determining the one or more objects added to the container match the list of objects, the one or more processors generating a notification confirming the match of content in the container to the list of objects.

DETAILED DESCRIPTION

Figure 1:
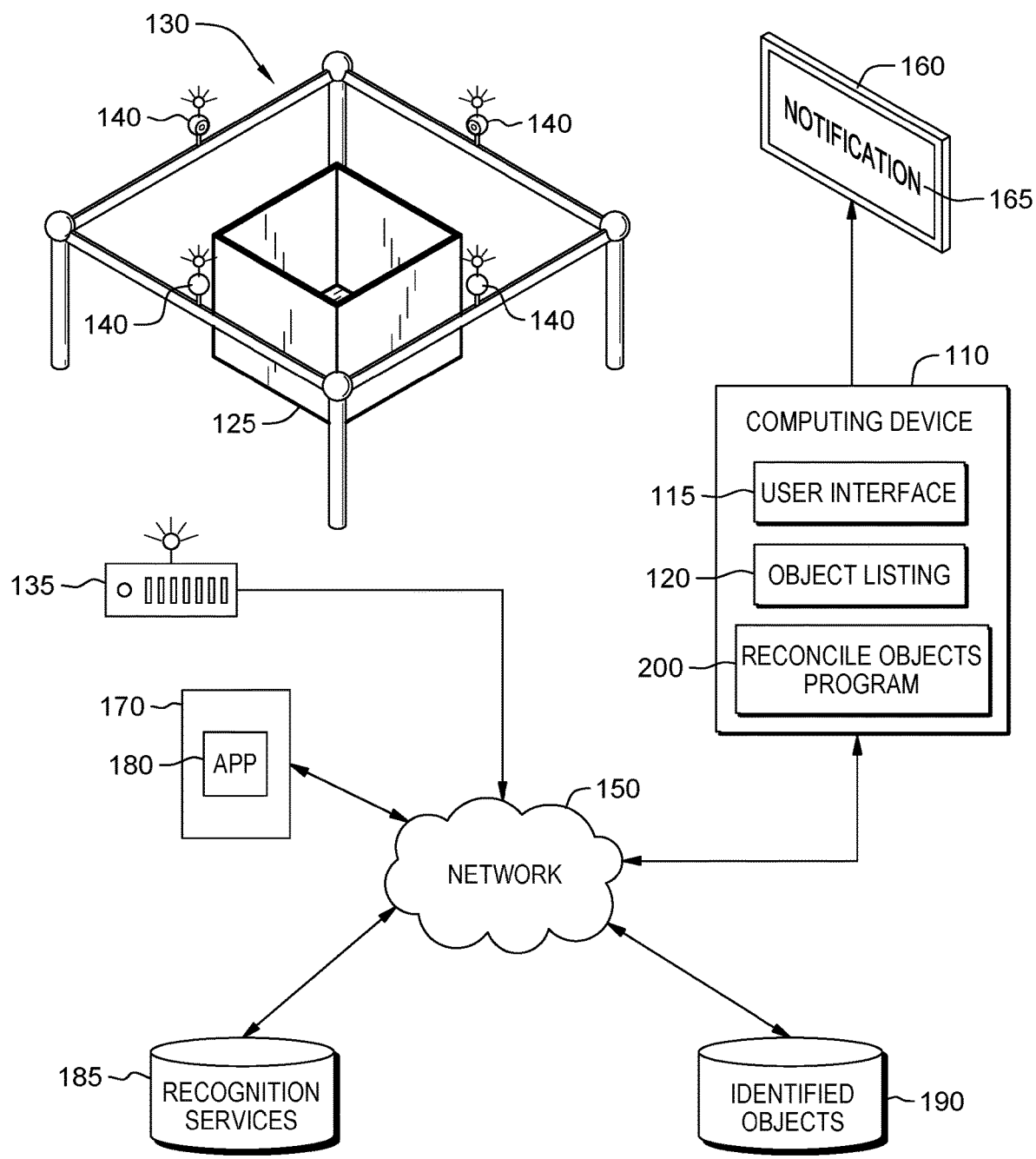
FIG. 1 is a functional block diagram illustrating a distributed data processing environment, in accordance with an embodiment of the present invention.

Embodiments of the present invention recognize that mistakes occur in loading of intended contents into a container. Mistakes may be attributable to distraction, forgetfulness, or confusion associated with the container purpose, but often result in delays, re-opening containers and inspecting the contents, proceeding with uncertainty, or having to deal with the consequences of content errors at a subsequent time. Embodiments of the present invention further recognize that errors of content inclusion in the process of loading a container include both omitting items intended to be loaded as well as including items unintended for loading into the container. Embodiments of the present invention also recognize that containers, as referred to herein, include a range of vessel sizes, from containers used for transoceanic cargo, cross country rail or trucking transport, or personal containers such as luggage, bags and backpacks.

Embodiments of the present invention disclose a method, computer program product, and system for determining whether objects added to a container are consistent with a pre-determined listing of objects intended for inclusion in the container. In some embodiments, a pre-determined list of objects to include in the container is received, and as objects are added to the container sensors positioned to monitor the opening of the container generate data associated with the added objects. The sensor data is analyzed by use of a RESTful (Representational State Transfer) service providing an object recognition capability trained to identify objects from the received sensor data. Identified objects are compared to the pre-determined list of objects intended to be loaded into the container by a reconciliation activity. Subsequent to a triggering event indicating the loading of objects is complete, a notification is provided indicating the result of the comparison between the pre-determined list of objects and the identified objects added to the container. The notification may indicate an object is missing from the expected container contents or may indicate that an additional object has been loaded into the container unexpectedly.

In some embodiments of the present invention, a pre-determined list of objects is created comprising items that are expected to be loaded into a particular container. The list of objects, sometimes also referred to as a list of items, can be modified to add or remove items, or a new list can be created by selecting objects from one or more existing lists. In some embodiments, the pre-determined list is created by a user associated with the loading of object into the container. In other embodiments, the list is automatically generated based on input received, such as a purchase order, a known list of ingredients, or standard assortment of contents, such as items included in a first aid kit.

In some embodiments of the present invention, sensor data detecting objects added to the container may include data from RFID detectors, bar code readers, or QR code readers. In other embodiments the sensors are miniature cameras embedded in positions around the opening used for loading objects into the container or may be positioned on the inner sides of the container and may be included on the base of the inside of the container. In some embodiments, the cameras are configured with night vision capability to function in very low light conditions and may include programmable stereoscopic features enabling three-dimensional imaging. The cameras capture multiple images or multiple frames from video as data, and wirelessly transmit the image data to a network connection device making the image data accessible. In some embodiments, the image data transmission includes sending the image data to a RESTful service performing object recognition. The object recognition service is trained by a large plurality of labeled data images and refined using neural network machine learning to accurately identify objects loaded into the container as detected by the plurality of cameras.

In some embodiments of the present invention, the cameras are initiated by motion detection of an object added to the container, and the generation of image data triggers the RESTful service call to an object recognition service. The object recognition service identifies the object from the image data and returns the identification of the object. In some embodiments, the identities of objects are stored and associated with other data from other applications granted interaction by user permission. Content and data from a calendar application, a note pad application, or global positioning service (GPS) features may provide alternative information and context associated with the set of objects loaded into a particular container that may be associated with a particular date, event, activity, or destination. For example, a user's container designated to include a pre-determined list of objects may access a calendar function and determine the user has a product demonstration scheduled for a client that day and includes the product object as an expected addition to the container.

In other embodiments the miniature cameras are alternatively attached to a supporting structure separate from but aligned with the opening of the container. The separate structure supporting attachment of the cameras may be of any size and may adjust to accommodate a variety of container sizes to be loaded. The supporting structure and attached cameras may serve as part of a container loading station. In some embodiments of the present invention, the cameras are connectively attached to the supporting structure, whereas in other embodiments, the cameras are positioned remote to the container, but invoke a zoom-in/zoom-out feature to accommodate containers of various sizes.

In some embodiments of the present invention, optical character recognition is employed as a call to a RESTful service to aid in identification of an object loaded into the container. The image data from one or more cameras is analyzed and determined to include characters as part of text, such as a label or recognizable symbol. The image data is sent via a call to a RESTful service providing character recognition, and the recognition of the text or symbols are returned and included as input data for object recognition. Embodiments include various triggering events indicating the loading of objects into a container as well as when loading is complete. In some embodiments, sensor collection of data is triggered by motion detection associated with loading objects into the container. In other embodiments, sound detection associated with opening the container initiates sensor data collection. In yet other embodiments, sensor data collection is initiated manually. Completion of loading objects into the container, in some embodiments, is determined based on sound detection of closing the container, time elapsed since the previous detection of an object loaded into the container, voice command indicating completion of loading, or manually indicating completion of loading.

In some embodiments of the present invention that include retail container loading, sensor detection of objects being loaded that appear to be smaller containers generates a notification or alert. Continued trusted loading requires sensor view of the contents of the smaller container, or detection of content identification in the form of a seal that includes sensor detectable code of the contents. In some embodiments, information associated with the object being loaded may include the object weight, and detection of a weight change inconsistent with the expected object weight generates an alert.

In some embodiments, triggering events indicating completion of loading of objects into the container initiates a notification response. The notification may indicate missing objects, additional objects, or loaded items are "as-expected." In some embodiments a notification may include both indication of missing and additional items as compared to a pre-determined list, such as when one item is loaded mistakenly for an expected item. In some embodiments, the notification is delivered to a visual display, such as a text message or alert, and includes information regarding deviations detected between the objects loaded in the container and the pre-determined list of expected objects. In other embodiments, the notification may be an auditory notification performed by a voice-assistant device that audibly declares in an artificial voice the deviations found, or confirms the objects loaded were expected ("all expected items are present").

In some embodiments of the present invention, additional container sensors are positioned to detect images of an individual loading/unloading a container, and images are sent to a facial recognition RESTful service which confirms authorization or provides alerts that the loading/unloading user is unauthorized. Setup of container loading/unloading may include identification data of authorized users. In other embodiments, other biometric data may be used to authenticate authorized users. In yet other embodiments, a badge including identification coding or embedded devices may be detected by the container sensors and determine authorization of the loading/unloading user.

In some embodiments of the present invention, content loading is secured by a sensor test confirming coverage of the entire opening of the container. Continuity of coverage of the opening is enabled by additional sensors detecting movement or removal of the container from a loading position, blocking of a sensor, and in some embodiments, detection of weight change inconsistent with loading/unloading detection by sensors.

In yet other embodiments, other types of notifications and alarms are used to indicate missing, additional items were detected, or that all expected items were confirmed as loaded into the container, such as indicator lights, sounds, email, or text messages sent to a smart device. In some embodiments, if the loading of the container is interrupted, the user may prompt the application to identify what items have already been loaded into the container, with the application responding with the identity of items detected as loaded into the container. Responses may include an audible response from a voice assistant device, a visual display, or a message, listing the identity of items loaded. Similarly, in some embodiments in which there is uncertainty that a closed container includes all expected items, the user requests a listing or recitation of the contents loaded into the container as an alternative to re-opening a closed container to verify all intended items are included.

The present invention will now be described in detail with reference to the Figures. FIG. 1 is a functional block diagram illustrating a distributed data processing environment, generally designated 100, in accordance with an embodiment of the present invention. Distributed data processing environment 100 includes computing device 110, container 125, sensor frame 130, network connection 135, sensors 140, notification display 160, smart device 170, recognition services 185, and identified objects database 190, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between network connection 135, computing device 110, smart device 170, recognition services 185, identified objects database 190, in accordance with embodiments of the present invention.

Container 125 is a structure into which an object may be loaded and subsequently carried, shipped, moved, or stored. In embodiments of the present invention, container 125 may be constructed out of cardboard, metal, plastic, paper, wood, or any material supportive of the contents of container 125. Container 125 may be square, rectangular, round, cylindrical, or any shape accommodating the contents of container 125. In embodiments of the present invention, container 125 includes an opening into which object are loaded, and around which are located sensors 140 that monitor the activity of adding or removing objects from container 125. In some embodiments of the present invention, container 125 includes sensors 140 as embedded, attached, or connected components of container 125, enabling sensors 140 to monitor the objects loaded into or removed from container 125.

In some embodiments, container 125 is a very large sized structure used to contain large objects or large quantities of smaller objects. In other embodiments, container 125 is a medium sized or small sized container. For example, container 125, as a very large container, may be a cargo container carried on cross-oceanic ships, trains, and large trucks. Container 125, as a medium sized container, may be a box or package for shipment and delivery of objects from manufacturers to warehouses and to final destinations. Container 125, as a small container, may be a small product package, an envelope-style package, a pharmaceutical package, a bottle, or a bag, such as a backpack.

Sensor frame 130, as depicted in FIG. 1, is a structure supporting sensors 140 arranged to monitor the opening of container 125. Sensor frame 130 is constructed of material having strength and composition to support sensors 140 and provide position and perspective for detection of object shape, size, and attributes as the objects are loaded into container 125. In some embodiments of the present invention, sensor frame 130 is of a size and position enabling unobstructed loading of objects into container 125. In some embodiments, sensor frame 130 may be part of a loading station and include properties enabling adjustment of the length, width and height of the portions of sensor frame 130 that include and support sensors 140. In some embodiments, sensor frame may be part of container 125, in which sensors 140 are embedded or attached to portions of container 125 enabling monitoring of objects loaded into or removed from container 125.

In an example embodiment, sensor frame 130 is a steel rectangular frame with sensors 140 attached to the upper portion of the rectangular frame and posts at each corner of the rectangular frame positioning sensor frame 130 at a height adequate to monitor the opening of container 125, which is placed in a centered position relative to the upper rectangular portion of sensor frame 130. In another example embodiment, sensors 140 are embedded within sensor frame 130 as part of the material of container 125, such as the material of a backpack. Embodiments in which sensor frame 130 is integrated with container 125, sensors 140 are positioned around the opening of container 125, and sensor frame 130 or container 125 may include a power supply enabling sensors 140.

Network connection 135 is a network interface to network 150. In some embodiments of the present invention, network connection 135 provides transmission of and access to data from sensors 140. In some embodiments, network connection 135 receives wireless data transmitted from sensors 140 and transmits the data from sensors 140 to reconcile objects program 200 operating on computing device 110. In other embodiments, network connection 135 receives data transmitted from sensors 140 via wired connections (not shown). In some embodiments, network connection 135 is connected to network 150 wirelessly, whereas in other embodiments, network connection 135 includes a wired connection to network 150. In yet other embodiments, sensors 140 may include wireless transmission of data directly to computing device 110, in which case network connection 135 may not be utilized.

Sensors 140 are a set of sensors capable of detecting the loading of objects into container 125, or the unloading of objects from container 125. In some embodiments of the present invention, sensors 140 are a set of stereoscopic miniaturized cameras capable of generating images of objects loaded into container 125. In some embodiments, sensors 140 include motion detection triggering generation of images, as well as night-vision capability for image generation in low light conditions. Sensors 140 are depicted in FIG. 1 as supported by sensor frame 130, which provides position and elevation for sensors 140 to accurately monitor the objects loaded into container 125. The set of sensors of sensors 140 is not limited in number and includes an adequate number of sensors to detect the loading of objects into container 125, and determine the shape, size, and attributes of objects for identification by a RESTful recognition service.

In some embodiments, sensors 140 are positioned at a distance removed from container 125 and rely on optical zoom functions to adequately generate data to determine the size, shape, and attributes of objects loaded into or removed from container 125. In alternative embodiments, sensors 140 are attached to container 125, positioned in proximity of the opening of container 125 that is used for loading and unloading of objects. In some embodiments, sensors 140 may be embedded into the material of construction of container 125, whereas in other embodiments, sensors 140 may be attached to the material of construction of container 125, positioned at or near the opening used to load objects into container 125.

In yet other embodiments of the present invention, sensors 140 are capable of initiating and detecting radio frequency identification (RFID) of objects loaded into container 125, whereas in still other embodiments, sensors 140 generate images by sonar-based techniques. In some embodiments, sensors 140 receive object identification information directly from an object loaded into container 125, and sensors 140 transmits the identification information directly to reconcile objects program 200 operating on computing device 110.

Notification display 160 is connectively coupled to computing device 110 and in some embodiments of the present invention, presents a resultant display of comparisons between the objects loaded into container 125 and the objects included in object list 120. In some embodiments, notification display presents an image including a summarization of the identified objects loaded into container 125. The listing presented on notification display 160 of objects loaded into container 125 may be accompanied by the pre-determined object list 120, showing a comparison. Objects not reconciled between the two lists may be highlighting (i.e., adding emphasis) to indicate a missing object, or an unexpected object loaded into container 125.

In some embodiments, notification display 160 is a voice-enabled assistant and audibly notifies an identity of object differences between objects loaded and objects expected and included in object list 120. In some embodiments, notification display 160 is a display component of a mobile smart device, such as a smart phone or tablet. In some embodiments, notification display 160 is enabled to present (audibly or visually) a list of all objects loaded into container 125 for the current loading activity. In other embodiments, notification display 160 may be a set of indicator lights that indicate whether the loaded objects are reconciled with the expected objects of object list 120, whereas in other embodiments, notification display 160 is an alarm presented when object loading is determined to be complete and the identified loaded objects fail to match the objects included in object list 120.

Mobile app 180 is an application installed on smart device 170 that enables input from additional applications of smart device 170 to be received by reconcile objects program 200. Mobile app 180 receives permissions for access to additional applications of smart device 170, such as a calendar app, a GPS app, or a note pad app, which may offer additional information associated with expected objects loaded into container 125. For example, consider that container 125 has been identified as a carrying luggage container and is being loaded with objects while positioned within senor frame 130 with active sensors 140.

Mobile app 180 operating on smart device 170 enables information from a calendar function of smart device 170 to be accessed by reconcile objects program 200, which determines a planned activity of departure from a local airport indicated on a calendar app operating on smart device 170. Reconcile objects program 200 identifies a large bottle of liquid shampoo and a pocket knife loaded into container 125. Reconcile objects program 200 recognizes the planned activity of an airport departure and generates a notification indicating that loaded objects are not acceptable for airport carry-on containers. In some embodiments of the present invention, reconcile objects program 200 lists the objects that violate airport security rules, including the large bottle of liquid shampoo and the pocket knife, on notification display 160. In another example, a client appointment memo on a user's note pad app (i.e., mobile app 180) on the user's smart device (i.e., smart device 170) is accessed by reconcile objects program 200, in which the user makes notes of plans to demonstrate a product feature to a client. The memo of the note pad app triggers reconcile objects program 200 to include the product in an expected "take-to-work" container list of object to be loaded by the user on the day of the client appointment.

In some embodiments of the present invention, mobile app 180 includes a capability to receive notification messages delivered from reconcile objects program 200 that communicates whether objects loaded into a container, such as container 125, include all expected objects, or whether objects are missing or unexpected objects (or inappropriate objects for a determined destination) are included.

Smart device 170 is a mobile programmable computing device capable of generating one or more pre-determined lists of objects, such as object list 120, and in some embodiments of the present invention, enabled to receive a notification from reconcile objects program 200 indicating reconciliation information between a selected pre-determined object list and identified objects loaded into container 125 during a current or most recent activity of object loading. In some embodiments, smart device 170 is configured to receive a notification from reconcile objects program 200, based on a user preference, indicating results of reconciling loaded objects of container 125 to a pre-determined list of objects, such as object list 120. A notification received by smart device 170 may include a visual display of the results of reconciling the objects loaded into container 125 with object list 120; including missing or unexpected objects. In another embodiment, smart device 170 is configured to produce an audible response to reconciling the objects loaded into container 125 with object list 120. In some embodiments, smart device 170 is enabled to generate an object list for container 125, such as object list 120, as well as modify an existing object list and select items from one or more existing object lists to generate a new object list.

Recognition services 185 is an existing Representational State Transfer (RESTful) service that receives and analyzes sensor data and determines and performs an identification of an object associated with the sensor data received. In some embodiments of the present invention, recognition services 185 is trained by labeled data of known object types and sizes and is further refined by applying neural network machine learning techniques. In some embodiments, recognition services 185 is trained using a large quantity of images of objects in different orientations and different types of handling techniques, such as, but not limited to, handling by a human hand, a robotic device, a conveyor, a crane, or other handling device.

Recognition services 185 determines attributes of received sensor data and identifies an object most closely associated with the received sensor data. In some embodiments, the received data are image data from cameras monitoring objects added to a container. In other embodiments, sensor data received by recognition services 185 are RFID data and identify a particular object by associating the received RFID with stored identification data. In yet other embodiments, the sensor data received by recognition services 185 is sonar-type data and is compared with stored, known data of similar type to determine a most closely matching object. In response to determining an identity of an object, recognition services 185 returns the determined identity of the object to reconcile objects program 200, operating on computing device 110.

Identified objects database 190 is a database that includes objects identified and returned by recognition services 185. Identified objects database 190 also associates the identified objects with current and previous object lists and includes context information associated with the object lists. In some embodiments of the present invention, the data stored in identified objects database 190 is used to determine likely associations of objects and establish an anticipation or expectation of a first item associated with a second item, when a first item is loaded into a container. The association may also be based on the history of the recipient or owner of the container. For example, identified objects database 190 includes identification of multiple holiday decorated boxes used for including presents, ordered by company A. The context information associated with the identified holiday decorated boxes indicates that the boxes are commonly ordered in a particular month of the year and include a quantity of a holiday wrapping paper. Reconcile objects program 200 can access identified objects database 190 to determine the association of the holiday decorated boxes, the holiday wrapping paper, the month of the year and company A, and anticipates the association of wrapping paper with the decorated boxes. In another example, identified objects database 190 may associate identified objects with a particular user, also in context with location, time of year, frequency of identification, and other attributes associated with the identified objects of the particular user.

In some embodiments, the data stored in identified objects database 190 is used by object providers to present the particular user with options and alternatives to objects the user has frequently loaded into a container. For example, a user travels frequently and uses a luggage container, container 125, enabled with sensors 140 and reconcile objects program 200 operating on the user's smart phone, such as smart device 170. Identified objects database 190 stores data associated with objects the user includes in container 125, which includes shoes, and hair care products. Subsequent to several trips that include loading container 125, identified objects database 190 includes identified shoes and hair care products associated with one or more locations determined by Global Positioning Service (GPS) data from the user's smart device 170, and calendar data of smart device 170 indicating the scheduled travel. In some embodiments, data from identified objects database 190 is made available to providers of hair care products and providers of shoes, who provide offers to the user of container 125 to replace or augment shoe and hair care products.

Computing device 110 includes user interface 115, object listing 120, and reconcile objects program 200. Computing device 110 can be a standalone computing device, a management server, a web server, a mobile computing device, or any other electronic device or computing system capable of receiving, sending, and processing data. In other embodiments, computing device 110 can represent a server computing system utilizing multiple computers as a server system, such as in a cloud computing environment. In another embodiment, computing device 110 can be a laptop computer, a tablet computer, a netbook computer, a personal computer (PC), a desktop computer, a personal digital assistant (PDA), a smart phone, or any other programmable electronic device capable of communicating with devices of recognition services 185, identified objects database 190, notification display 160, smart device 170, sensors 140, network connection 135, and other computing devices (not shown) within distributed data processing environment 100 via network 150. In another embodiment, computing device 110 represents a computing system utilizing clustered computers and components (e.g., database server computers, application server computers, etc.) that act as a single pool of seamless resources when accessed within distributed data processing environment 100. Computing device 110 may include internal and external hardware components, as depicted and described in FIG. 3.

User interface 115 provides users of computing device 110 an interface to reconcile objects program 200. In one embodiment, user interface 115 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to smart device 170 and computing device 110. Mobile application software, or an "app," is a computer program designed to run on smart phones, tablet computers and other mobile devices. User interface 115 enables a user of computing device 110 to input one or more lists of expected objects to be loaded into a container, such as container 125. In some embodiments, input of one or more lists of expected objects to be loaded into a container is automatically received from a communications port of computing device 110.

Object list 120 includes a listing of objects expected to be loaded into a container. In some embodiments of the present invention, object list 120 may be manually entered by a user accessing reconcile objects program 200 on computing device 110 via user interface 115. In other embodiments, object list 120 may be an aggregate of selections of objects from one or more existing lists of objects. In yet other embodiments, object list 120 may be obtained from another source, such as an electronic shipping list generated from or stored in another computing device and accessed by reconcile objects program 200 operating on computing device 110. In some embodiments of the present invention, object list 120 is stored as a history in identified objects database 190, accessible for selection of objects from existing or previous object lists, or as a source of information of objects loaded in a frequently used container by a user of the container.

Reconcile objects program 200 is an application depicted as operating on computing device 110 and reconciling differences between a list of objects expected to have been loaded into a container and identification of objects actually loaded into the container. In some embodiments of the present invention, reconcile objects program 200 receives input of expected objects to be loaded into a container, generating one or more object lists. In some embodiments, the input is manual by a user accessing reconcile objects program 200 via user interface 115 on computing device 110. In other embodiments, reconcile objects program 200 accesses a source external to computing device 110 and generates an expected object list, such as a shipping order or purchase order. In other embodiments, reconcile objects program 200 receives digitized expected object lists automatically from an external source. In some embodiments reconcile objects program 200 accesses permissioned applications on a smart device associated with a container to be loaded and includes input of information from applications of the smart device in generating or modifying an object list.

Reconcile objects program 200, in some embodiments, is initiated by motion detection sensors detecting an object being loaded into a container located in an observable position of the sensors. Reconcile objects program 200 receives data from the sensors and generates a call to recognition services 185, sending the sensor data to the recognition service. Reconcile objects program 200 receives from the recognition service, identification of the object loaded into the container and includes the identified object in a listing of loaded objects. In response to determining completion of the loading of objects into the container, reconcile objects program 200 determines differences between the expected list of objects to be loaded into the container and the objects actually identified as loaded into the container.

For example, a user accesses reconcile objects program 200 via user interface on computing device 110 and inputs a list of objects comprising object list 120, expected to be loaded into container 125 positioned within sensor frame 130 that includes sensors 140 attached to sensor frame 130.

Sensors 140 detect motion of an object loaded into container 125 and alerts reconcile objects program 200 via transmission from network connection 135 to network 150. Reconcile objects program 200 receives the data from sensors 140, which may be image or video data from cameras positioned to observe the loaded object. Reconcile objects program 200 calls recognition services 185 via a RESTful service call and transmits the data from sensors 140. Reconcile objects program 200 receives an identification of the object loaded into container 125 from recognition services 185. Reconcile objects program 200 repeats the activity for each object detected as loaded into container 125.

Reconcile objects program 200 determines that the loading of objects into container 125 is complete. In some embodiments, reconciled objects program detects a "closing sound" of container 125 via a microphone positioned on or near sensor frame 130 (not shown), or a verbal command by a user. In some embodiments, completion of loading of container 125 is determined by a pre-determined amount of time of loading inactivity. In response to determining that the loading of objects into container 125 is complete, reconcile objects program 200 determines differences between the expected object list 120 and the actual identified objects loaded into container 125.

Reconcile objects program 200 generates a notification indicating whether the actual objects loaded into container 125 match the expected objects, and indicates differences detected. In some embodiments, reconcile objects program 200 delivers the generated notification to notification display 160, or in other embodiments, the generated notification is delivered to a predetermined destination. In some embodiments, reconcile objects program 200 generates a notification of alternatives to one or more objects loaded into container 125 as a potential source of addition or replacement opportunity of the one or more objects.

Figure 2:
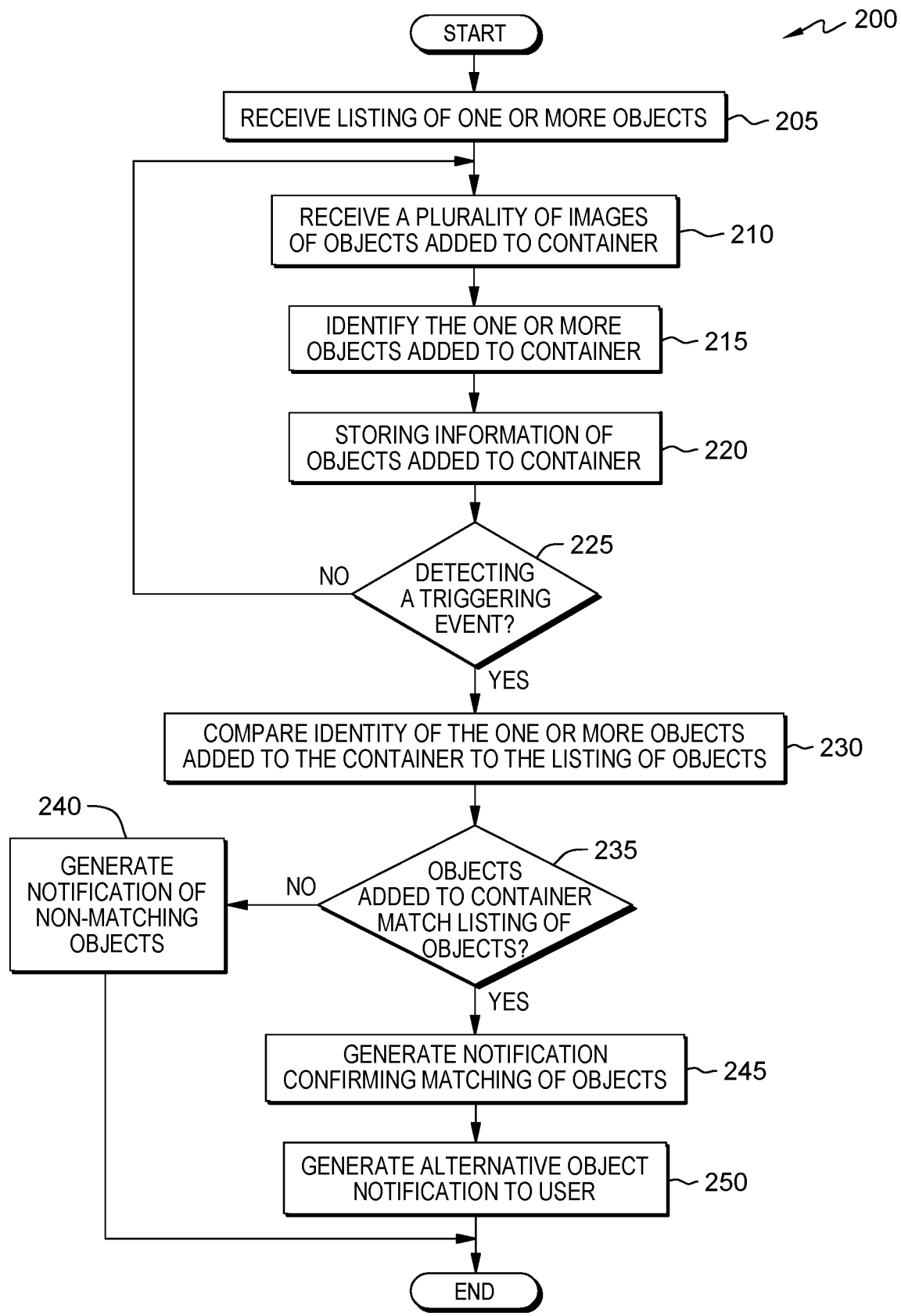
FIG. 2 illustrates operational steps of an object reconciliation program, inserted on a computing device within the distributed data processing environment of FIG. 1, in accordance with an embodiment of the present invention.

FIG. 2 illustrates operational steps of reconcile objects program 200, operating on computing device 110 within distributed data processing environment 100 of FIG. 1, in accordance with an embodiment of the present invention.

In step 205 reconcile objects program 200 receives a listing of one or more objects expected to be loaded into a container. The expected object list, such as object listing 120, is associated with the container and may be further associated with a day of the week, time of day, a particular destination, or other information received from permissioned applications of a smart device. In some embodiments of the present invention, reconcile objects program 200 receives manual input comprising an expected list of objects to be loaded into a container. In other embodiments, reconcile objects program 200 accesses a source and obtains a digitized list of objects expected for loading into a container. In some embodiments, a new list of expected objects for loading into a container may be generated, in other embodiments a list may be generated by selecting objections from previously generated lists of objects. In some embodiments an existing list of expected objects for loading into a container may be modified. For example, reconcile objects program 200 accesses a file including a list of objects expected for loading into container 125, representing a shipping order of objects to load into container 125.

In step 210 reconcile objects program 200 receives a plurality of images of objects added to the container. In some embodiments of the present invention, sensors are positioned to detect the motion of an object being loaded into the container. In some embodiments, the sensors are cameras with motion detection capability, positioned around the opening of the container and observable of objects placed into the container. In some embodiments the cameras generate images that are transmitted to reconcile objects program 200 as the objects are loaded into the container. For example, as an object is loaded into container 125, positioned within sensor frame 130, which supports sensors 140 observing and detecting the loading of the object into container 125, sensors 140 generate images of the object being loaded and transmit the images via network connection 135 connected to network 150, to reconcile objects program 200 operating on computing device 110.

In step 215 reconcile objects program 200 identifies the one or more objects added to the container. In some embodiments of the present invention, in response to receiving images of an object added to the container, reconcile objects program 200 creates a RESTful service call to a recognition service and transmits the image data received from the sensors monitoring the adding of objects into the container. The recognition service receives the image data and identifies the object based on performing object recognition techniques and a plurality of image data included in a recognition library accessible to the recognition service. The recognition service determines the identification of the object associated with the received image data and transmits the identification of the object to reconcile objects program 200. For example, the image data from sensors 140 received by reconcile objects program 200 of objects added to container 125 are transmitted to recognition services 185 by a RESTful service call from reconcile objects program 200 via network 150. Recognition services 185 performs object recognition techniques based on machine learning, utilizes a library of labeled object image data, and determines the identification of the object. Recognition services 185 transmits the identification of the object to reconcile objects program 200 via network 150.

In step 220 reconcile objects program 200 stores the identification information of objects added to the container. In some embodiments, reconcile objects program 200 stores the identification of the objects added to the container, and may associate the objects with the container and with a particular activity, date, time, or event received as input associated with the addition of objects to the container. The loading of objects into the container may be associated with a labeled list of expected objects to add to the container. The labeling of the list of objects to add to the container may include information associated with an activity, such as a shipping list to a destination, a purchase order, an inventory activity, taking the container to work, taking the container to the gym, or including the container as part of another activity. The identification of the objects added to the container are stored along with the activity information associated with the container. For example, objects are added to container 125 and the identification of the objects added are stored in identified objects database 190 along with labeling information of the corresponding expected list of objects, which may be a shipping list to an address in Memphis, Tenn. Storing of information of objects added to container 125 may also include the activity associated with container 125, such as shipping order XYZ.

In decision step 225 reconcile objects program 200 determines whether a triggering event is detected indicating completion of adding objects to the container. In some embodiments of the present invention, having received an identification of the one or more objects loaded into the container, reconcile objects program 200 remains in a listen state, monitoring for detection of additional object added to the container. In some embodiments, reconcile objects program 200 determines a triggering event of completion of adding objects to the container by a pre-determined amount of time passing without motion detection of an object added to the container. In some embodiments, the completion of adding objects to the container is triggered by reconcile objects program 200 receiving an audible command from a user detected by a microphone in the proximity of the user.

In other embodiments, a triggering event of completion of adding objects to the container may be audible detection of the sound associated with closing the container, whereas in other embodiments, images of the container being closed are transmitted to the recognition service and are identified as closing the container. For the case in which a triggering event of the completion of adding objects to the container is not detected (step 225, "NO" branch), reconcile objects program 200 returns to step 210 and continues to receive a plurality of images of object added to the container. For the case in which a triggering event of the completion of adding objects to the container is detected (step 225, "YES" branch), reconcile objects program 200 proceeds to step 230 and compares the identity of the one or more objects added to the container to the list of expected objects.

For example, having detected multiple objects loaded into container 125, positioned within sensor frame 130, which supports sensors 140, and having received the identification of the multiple objects loaded, reconcile objects program 200 monitors the opening of container 125 and fails to detect a motion indicating objects added to container 125 for a period of time exceeding a pre-determined threshold of inactive object loading. The detected inactivity period is a triggering event indicating to reconcile objects program 200 that loading of objects into container 125 is complete. Reconcile objects program 200 proceeds to compare the identities of the loaded objects to the object included in the expected object list for container 125. In another example, reconcile objects program 200 detects a triggering event by identifying an audible command from a user transmitted from a microphone (not shown) integrated into container 125 and wirelessly transmitted to network connection 135 and received by reconcile objects program 200 via network 150.

In step 230 reconcile objects program 200 compares respectively, the identity of the one or more objects added to the container, to the listing of objects expected to be loaded into the container. In some embodiments of the present invention, reconcile objects program 200 includes user-set options that apply to a determination of missing or additional objects added to a particular container.

In decision step 235, reconcile objects program 200 determines whether objects added to the container match the objects in the list of objects expected to be added to the container. In some embodiments, reconcile objects program 200 determines whether an object is missing from the container as compared to the list of objects expected to be included in the container. In some embodiments, reconcile objects program 200 confirms whether a set of "must have" objects are included in the container, and ignores additional objects added to the container. In other embodiments, reconcile objects program 200 determines both missing and additional objects added to the container, as compared to the list of expected objects to be loaded into the container.

For the case in which reconcile objects program 200 determines that the identity of the objects added to the container do not match the list of objects expected to be added to the container (step 235, "NO" branch), reconcile objects program 200, in step 240, generates a notification of non-matching objects. In some embodiments of the present invention, reconcile objects program 200 includes the identity of objects missing from the container in the notification. In some embodiments, the notification generated by reconcile objects program 200 includes the identity of additional objects added to the container other than the objects expected to be added to the container. In some embodiments, the notification includes identification of both missing and additionally added objects.

For example, reconcile objects program 200 determines that object A is included in object list 120, expected to be loaded in container 125. Reconcile objects program 200 did not detect object A as an object added to container 125 and concludes that object A is missing from the one or more objects loaded into container 125. Additionally, reconcile objects program 200 determines that object X was added to container 125, however, object X is not included in object list 120, which lists objects expected to be added to container 125. Reconcile objects program 200 generates a notification that lists object A as missing from loaded container 125, and additionally lists object X as added to container 125, but not listed in object list 120 for container 125.

For the case in which reconcile objects program 200 determines the objects added to the container to match the list of objects expected to be added to the container (step 235, "YES" branch), reconcile objects program 200, in step 245, generates a notification confirming a match of the added and expected objects. For example, having compared the identities of objects added to container 125 to the list of expected objects to be added to container 125, reconcile objects program 200 determines that the objects loaded, and list of objects expected match, and generates a notification, such as "Objects added to container match expected objects."

Having generated a confirmation notification in step 245, or alternatively generating a non-matching notification in step 240, reconcile objects program 200 generates a notification to the user that includes alternative objects (step 250). In some embodiments of the present invention, reconcile objects program 200 determines identified objects frequently added to a container, based on data from identified objects database 190. In some embodiments of the present invention, reconcile objects program 200 receives a notification that includes available alternatives to the identified objects. In some embodiments, the alternative objects are submitted to reconcile objects program 200 from providers with permissioned access to identified objects database 190 and reconcile objects program 200 presents to the alternative objects in a notification for user awareness and potential access.

For example, a user of container 125 includes adding a particular laptop to container 125, among a list of other objects, when the user is traveling for business related purposes. The user of container 125 makes several business trips each month, and when preparing for a trip the particular laptop, including the manufacturer's logo and name on the cover of the laptop, is identified by reconcile objects program 200, and the identity of the laptop as an object added to container 125 is recorded and stored in identified objects database 190. Having agreed to share object data information, a provider of laptop computers receives information from identified objects database 190 associated with the user and container 125. Subsequent to reconcile objects program 200 confirming a list of objects added to container 125, including the identified laptop, reconcile objects program 200 generates a notification that includes information from the laptop provider regarding alternative laptops available to the user.

Additional embodiments of the present invention include a user of reconcile objects program 200 allowing the recognition of objects (items) to be shared with retail businesses for the purpose of recommending similar products to the user. The current objects recognized as added to the container can be from various providers, and the purchases can come from different brick-and-mortar stores, or online stores. Retail businesses can make use of the object identification data to align recommendations of purchases with the object data identified as added to the user's container. The recommendations can be through online shopping catalogs by using the information gained from the identified objects database, storing data of objects loaded into the respective user's container.

For example, the user shops at online store A and had previously bought socks from a large retail store W, and had placed the socks in their bag, thereby capturing the identity of the socks from object recognition data. Assuming that permission to acquire or access the object recognition data has been granted, the online store A develops recommendations using the object recognition data of the purchased socks from large retail store W. The user may receive a notification informing the user that the same or similar socks from the same vendor as those socks purchased from large retail store W, are available at the online store A. The user decides to order from the online store A rather than the large retail store W for sock purchases in the future. In some embodiments of the present invention, the object identification data associated with objects added to a user's container may serve suppliers an opportunity to present users alternative products or sources.

An alternative embodiment of the present invention is to enable supplier product recommendations from which the user can make product selections, based on the identified items added to a user's container.

Figure 3:
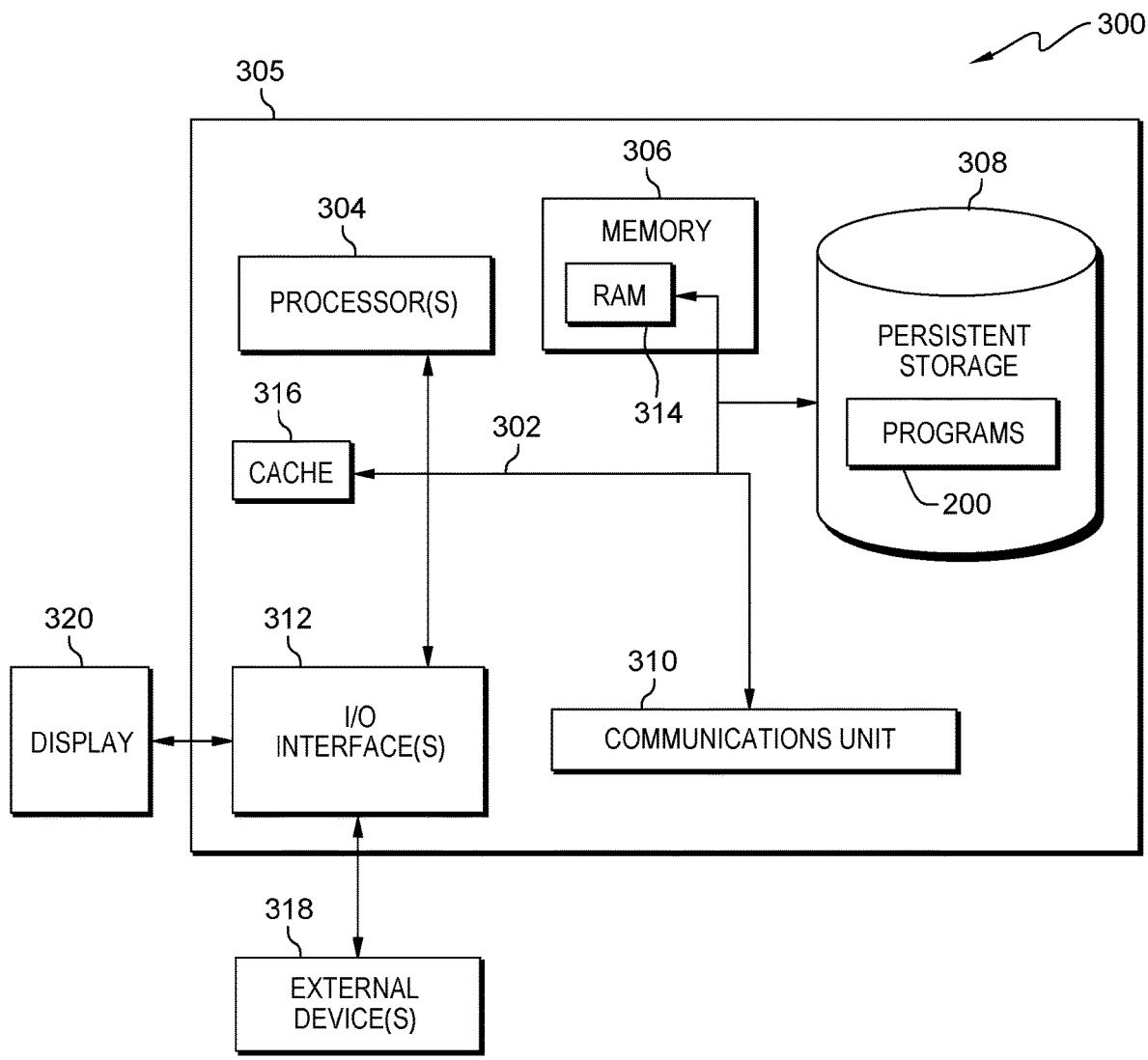
FIG. 3 depicts a block diagram of components of a computing system, including a computing device capable of operationally performing the object reconciliation program of FIG. 2, in accordance with an embodiment of the present invention.

FIG. 3 depicts a block diagram of components of computing system 300, which includes computing device 305. Computing device 305 includes components and functional capability similar to smart device 170, and computing device 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Reconcile objects program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Reconcile objects program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., reconcile objects program 200 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    one or more processors receiving input including a listing of objects to be added to a container;
    the one or more processors receiving a plurality of images of one or more objects associated with the listing of objects added to the container from one or more sensors positioned to monitor the opening of the container;
    the one or more processors identifying the one or more objects added to the container by performing object recognition techniques on the plurality of images;
    the one or more processors detecting whether a triggering event occurs indicating completion of adding the one or more objects associated with the listing of objects to the container;
    in response to detecting the triggering event, the one or more processors comparing an identity of the one or more objects added to the container to the listing of objects to be added to the container; and
    in response to determining the one or more objects added to the container fail to match the listing of objects, the one or more processors generating a non-matching notification.

2. The method of claim 1, further comprising:
    in response to determining the one or more objects added to the container match the listing of objects, the one or more processors generating a notification confirming the match.

3. The method of claim 1, further comprising:
the one or more processors receiving the plurality of images of the one or more objects added to the container based on the one or more sensors detecting motion near an opening of the container.

4. The method of claim 1, wherein the one or more objects added to the container are identified based on detecting optical codes within the plurality of images of the one or more objects added to the container.

5. The method of claim 1, further comprising:
the one or more processors modifying the listing of objects based on a context determined from a calendar function connectively associated with the container.

6. The method of claim 1, wherein the container is a personal portable container.

7. The method of claim 1, further comprising:
the one or more processors storing the identities of the one or more objects added to the container in context with a particular user; and
the one or more processors notifying the particular user of an available alternative to the one or more objects.

8. The method of claim 1, further comprising:
in response to determining an object of the one or more objects added to the container violates a condition of a destination of the container, based on a context of the destination, the one or more processors generating a notification identifying the violating object; and
the one or more processors delivering the notification to a user-specified destination.

9. The method of claim 1, wherein the plurality of images includes receiving radio frequency identification of the one or more objects added to the container.

10. A computer program product comprising:
one or more computer readable storage media and program instructions stored on the one or more computer readable storage media, the program instructions comprising:
program instructions to receive input including a listing of objects to be added to a container;
program instructions to receive a plurality of images from one or more sensors positioned to monitor the opening of the container and detect an object of one or more objects associated with the listing of objects added to the container;
program instructions to identify the one or more objects added to the container by performing object recognition techniques on the plurality of images;
program instructions to detect whether a triggering event occurs indicating completion of adding the one or more objects associated with the listing of objects to the container;
in response to detecting the triggering event, program instructions to compare an identity of the one or more objects added to the container to the listing of objects to be added to the container; and
in response to determining the one or more objects added to the container fail to match the listing of objects, program instructions to generate a non-matching notification.

11. The computer program product of claim 10, further comprising program instructions, stored on the one or more computer readable storage media, to:
generate a notification confirming the match, in response to determining the one or more objects added to the container match the listing of objects.

12. The computer program product of claim 10, further comprising program instructions, stored on the one or more computer readable storage media, to:
store the identities of the one or more objects added to the container in context with a particular user; and
notify the particular user of an available alternative to the one or more objects.

13. The computer program product of claim 10, further comprising program instructions, stored on the one or more computer readable storage media, to:
in response to determining an object of the one or more objects added to the container violates a condition of a destination of the container, based on a context of the destination, program instructions to generate a notification identifying the object violating the condition of the destination of the container; and
the one or more processors delivering the notification to a user-specified destination.

14. The computer program product of claim 10, wherein the plurality of images includes receiving radio frequency identification of the one or more objects added to the container.

15. A computer system comprising:
one or more computer processors;
one or more computer readable storage media; and
program instructions stored on the one or more computer readable storage media, the program instructions comprising:
program instructions to receive input including a listing of objects to be added to a container;
program instructions to receive a plurality of images from one or more sensors positioned to monitor the opening of the container and detect an object of one or more objects associated with the listing of objects added to the container;
program instructions to identify the one or more objects added to the container by performing object recognition techniques on the plurality of images;
program instructions to detect whether a triggering event occurs indicating completion of adding the one or more objects associated with the listing of objects to the container;
in response to detecting the triggering event, program instructions to compare an identity of the one or more objects added to the container to the listing of objects to be added to the container; and
in response to determining the one or more objects added to the container fail to match the listing of objects, program instructions to generate a non-matching notification.

16. The computer system of claim 15, further comprising program instructions, stored on the computer readable storage media for execution by at least one of the one or more processors, to:
generate a notification confirmation the match, in response to determining the one or more objects added to the container match the listing of objects.

17. The computer system of claim 15, further comprising program instructions, stored on the computer readable storage media for execution by at least one of the one or more processors, to:
to store the identities of the one or more objects added to the container in context with a particular user; and
to notify the particular user of an available alternative to the one or more objects.

18. The computer system of claim 15, wherein the listing of objects is modified based on a context determined from a calendar function connectively associated with the container.

19. The computer system of claim 15, further comprising program instructions, stored on the computer readable storage media for execution by at least one of the one or more processors, to:

in response to determining an object of the one or more objects added to the container violates a condition of a destination of the container, based on a context of the destination, generate a notification identifying the object violating the condition of the destination of the container; and deliver the notification to a user-specified destination.

20. The computer system of claim 15, further comprising program instructions, stored on the computer readable storage media for execution by at least one of the one or more processors, to:

store the identities of the one or more objects added to the container in context with a particular user; and notify the particular user of an available alternative to the one or more objects.

\* \* \* \* \*